W. W. RICHARDSON.
WATER WHEEL.
No. 103,657. Patented May 31, 1870.
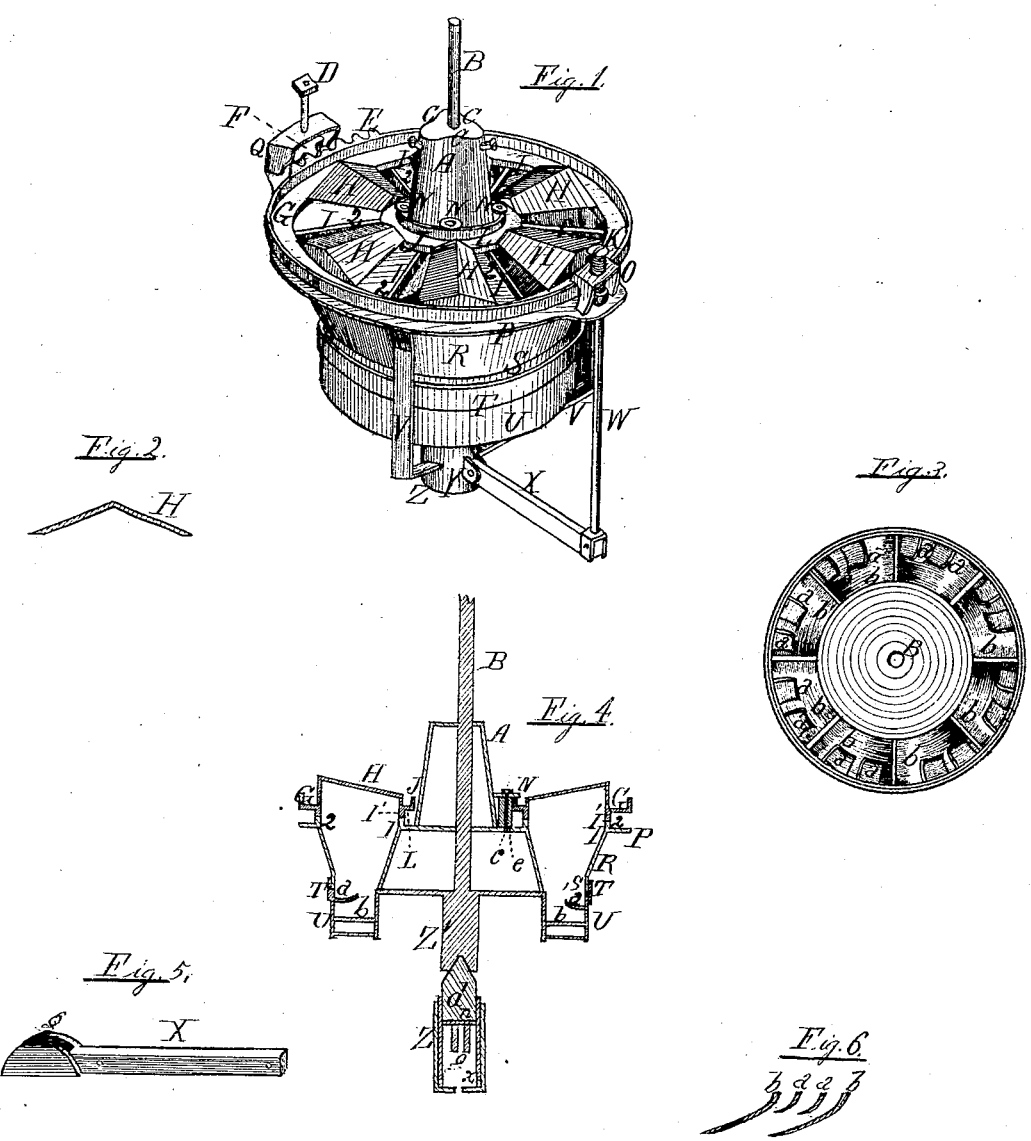

United States Patent Office.

WILLIAM W. RICHARDSON, OF CHICAGO, ILLINOIS.

Letters Patent No. 103,657, dated May 31, 1870.

IMPROVEMENT IN WATER-WHEELS.

The Schedule referred to in these Letters Patent and making part of the same.

*To all whom it may concern:*

Be it known that I, WILLIAM W. RICHARDSON, of Chicago, in the county of Cook and State of Illinois, have invented an "Improved Turbine Water-Wheel;" and I do hereby declare that the following is a full and exact description thereof, which will enable those skilled in the art to make and use the same, reference being had to the accompanying drawing and letters marked thereon, making a part of this specification, in which—

Figure 1 is a perspective representation of my improved turbine wheel.

Figure 2, a section of one of the cut-offs of the gate, showing the oblique angular form.

Figure 3, a plan view of the wheel, when removed from the guide-wheel.

Figure 4, a section of the wheel and its attachments.

Figure 5, a perspective representation of the lever and inverted rocker, for raising the wheel.

Figure 6, an elevation of the primary and secondary buckets.

The present invention relates to an improved submerged water-wheel, known as a turbine wheel; and Its nature consists—

First, in the peculiar construction of the gate, its cut-offs having an obtuse angular form, for preventing vegetable matter from accumulating, so as to shut off the flow of water.

Secondly, in forming flanges or rims around the chutes of the guide-wheel, so that the gate resting thereon may have no other downward bearing except on said flanges, the under part of the gate outside of the chutes and at its periphery being rabbeted out upwardly and outwardly, so that no lathe-work is required except it be to dress the flanges and the under edges of the cut-offs.

Thirdly, in the peculiar form of the dome of the guide-wheel, whereby, in the concave parts of said dome, anti-friction rollers may be placed, so as to allow the gate to have an easy reversible rotary movement for controlling the flow of water, while, at the same time, collars, placed on the tops of said rollers, hold the gate in position relative to the guide-wheel.

Fourthly, in providing the wheel proper with auxiliary buckets, suitably arranged so as to arrest the inward force of water as it comes from the guide-wheel, and so turn it outward as to secure a much greater leverage and power.

Fifthly, in combination with said buckets, the forming of a rim on the wheel, so projecting upward that the guide-wheel has nearly a water-tight bearing inside of it.

Sixthly, in the application of a lever, provided with a rocker-bearing, so arranged in combination with a step as to adjust the wheel to the proper height, as the whole is hereinafter fully described.

Fig. 3 represents the wheel proper, which is provided with the ordinary buckets *b b*, &c., having the usual form.

The wheel is also provided with a series of auxiliary buckets, *a a a*, &c., which are made of metal or other suitable material, and which are so fixed to the periphery of the wheel as to catch the water as it comes from the chutes I of the guide-wheel R, and arrest the major part of the water, and hold the same to bear against the periphery of the wheel, to gain additional leverage and power. After the water has operated upon the auxiliary buckets, it, the water, passing to the primary buckets, operates upon them with the same force as though the auxiliary buckets were not used, while, at the same time, a great increase of power is secured by this means.

A represents the dome of wheel, which has somewhat of a triangular form, but its sides are concaved out and its angles rounded, so that anti-friction rollers *e*, fig. 4, rotating on journals *c*, which are rigidly fastened to the top of the guide-wheel R, may have suitable positions, so as to bear against the inner periphery of the central flange L of gate G. This arrangement is important, for, if some provision be not made for a central bearing, the gate cannot so well be held in place, and, if the gate be not relieved near the central part, too great friction is the result.

On the top of the anti-friction rollers *e* are placed collars, N, which serve to hold the gate G in place on guide-wheel R, and also to hold the journals *c* in upright positions, so that the rollers *e* may always bear against the flange L, above described.

The cut-offs H of the gate G have an obtuse angular form, their apexes being placed upward, as shown in figs. 1 2, so that debris and vegetable substances, generally floating in water, may pass down the inclined sides of said cut-offs and through the chutes. This construction remedies a difficulty common to the ordinary register-gate, whose cut-offs are flat on top.

The cut-offs H in gate G are made, in length, to correspond to the radial lengths of the chutes I in guide-wheel R, and that portion of the under side of the gate which is at the ends of the cut-offs is rabbeted out upward and outward, as represented by division-line I' and letters G I, in section at fig. 4, said line being between flanges, P G, same figure, and between flange J and the top of guide-wheel R.

The chutes I are provided with upwardly-projecting flanges, 2, on all sides, of narrow width, so that the pressure of water from above on the gate, in view of its contact with the guide-wheel, will not subject the gate, in its rotary movement, to so much friction as to prevent it from being nearly automatically self-balancing. This arrangement is such that the water passes under the gate, leaving an area of atmospheric pressure of only so much surface as the tops of flanges 2 have; hence, but little more than the actual weight of the gate has to be contended with when being so turned as to give a flow of water into the chutes of the guide-wheel.

In this respect, the use of a powerful apparatus to move the gate is obviated, while, at the same time, the gate may be operated more speedily to control the rotary movement of the wheel.

The means now used to operate the gate G consists of a segment-rack, placed on the periphery of its flange, and operated upon by a pinion, F, which has bearings in a bridge, Q, fastened to said flange. This mechanism, however, may be light in its construction, inasmuch as there is not much power required to move the gate, when constructed, as above described, with reference to the flanges 2.

At S T it will be seen that the lower part of the periphery of the guide-wheel having chutes I is placed in side of the rim of wheel proper, U. By means of this construction, there cannot be leakage enough to cause any considerable waste of water, while, at the same time, the guide-wheel does not run so closely to the upwardly-projecting rim of the wheel U as to create much friction.

The vertical shaft B of the wheel U has a bearing, Z', in its lower end, in which a step, $d$, fig. 4, is so fitted to it, that the said shaft may have a suitable bearing to rotate on.

Beneath this step $d$ is placed a rocker-bearing, $g$, shown more clearly in fig. 5, which, when operated upon by a lever, X, pivoted to a collar-step, Z, will raise or lower the wheel U, and keep it in position relative to the guide-wheel R, said lever X, being provided with a connecting-rod, W, by means of which and a nut, K, operating above the flange of gate G, it is held in any required position for this purpose.

This step $d$ rests upon an annular plate, $n$, which is attached to cylinder $x$. This cylinder is fitted inside of the collar-step Z, and two sides of its periphern are so slotted out as to receive the rocker $g$, fig. 5, of the lever X. By this means the rocker $g$ always retains its proper position relative to the step $d$, so that, when said step is raised by means of said lever X, rocker $g$, and rod W, it (the step) will not be moved laterally out of place.

Claims.

1. The obtuse angular form of the cut-offs of the gate G, to prevent debris and vegetable matter from so collecting on the gate as to prevent the flow of water into the chutes of the guide-wheel R, as set forth.

2. The flanges formed around the chutes of the guide-wheel R, so that, when the outer and inner rims of the under side of the gate G are rabbeted out upward and outward, the cut-offs have the only bearing on the guide-wheel, in order that water may pass freely between the gate and guide-wheel, so as to relieve the gate from pressure of water, as set forth.

3. The peculiar construction of the dome A, it having three concave sides with rounded corners, so arranged as to form suitable supports for the anti-friction rollers $e$ to rotate in when said rollers are provided with collars N, to hold the gate G in place, and when they relieve the inner flange L from friction, as specified.

4. The guide-wheel R and wheel U, when the periphery of wheel R has a truncated conical form, and has a flange, S, projecting downward and inside of the upper flange T of the wheel U, and when they are operated in combination with gate C, dome A, and roller N, as and for the purpose specified.

5. The lever X, provided with a rocker-bearing, $g$, operating inside of the cylinder $x$, in combination with the rod W, shaft B, step $d$, annular plate $n$, and collar-step Z, substantially as described.

6. The auxiliary buckets $a$ $a$, so arranged as to discharge water into the primary buckets $b$ $b$, so as to cause a greater pressure of water against the periphery of the wheel, when they are used with a gate, G, and guide-wheel R, as specified.

WILLIAM W. RICHARDSON.

Witnesses:
G. L. CHAPIN,
E. E. GIBSON.